United States Patent [19]
Schneider

[11] Patent Number: 5,333,515
[45] Date of Patent: Aug. 2, 1994

[54] MOTORCYCLE THROTTLE CONTROL

[76] Inventor: William C. Schneider, P.O. Box 158, Superior, Mont. 59872

[21] Appl. No.: 70,895

[22] Filed: Jun. 3, 1993

[51] Int. Cl.⁵ .................... G05G 11/00; G05G 5/06
[52] U.S. Cl. .................... 74/489; 74/531; 74/527; 74/488; 74/502.2; 403/324
[58] Field of Search .......... 74/488, 489, 527, 531, 74/506; 403/324

[56] References Cited

U.S. PATENT DOCUMENTS

| Re. 31,196 | 4/1983 | Sowell | 74/488 |
| 2,589,554 | 3/1952 | Killian | 74/527 X |
| 3,982,446 | 9/1976 | Van Dyken | 74/488 |
| 4,364,283 | 12/1982 | Ricardo | 74/506 X |
| 4,562,872 | 1/1986 | Fushiya et al. | 74/531 X |

FOREIGN PATENT DOCUMENTS 888903  12/1943  France .................... 74/531

Primary Examiner—Vinh T. Luong
Attorney, Agent, or Firm—Harry M. Cross, Jr.

[57] ABSTRACT

A motorcycle throttle control for installation in a hand grip throttle control comprises a body designed to be threaded into a motorcycle throttle housing, a plunger within the body, and a cam lever mounted by the body for engaging the plunger to urge it into binding contact with a motorcycle throttle drum to hold a motorcycle throttle in a predetermined position.

8 Claims, 2 Drawing Sheets

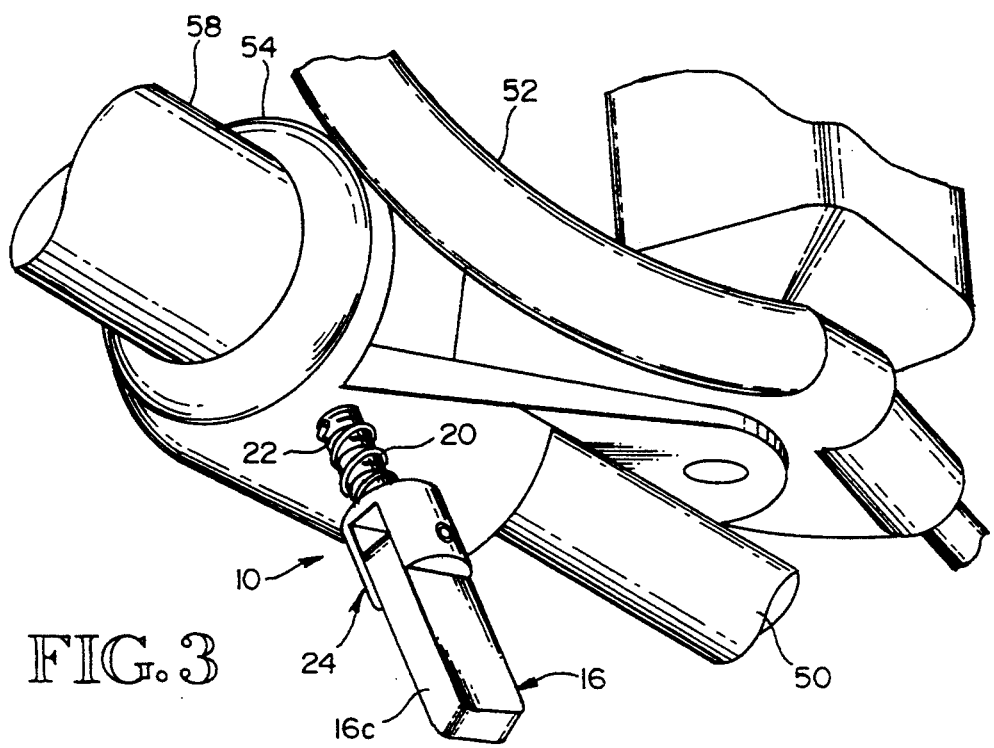
FIG. 3
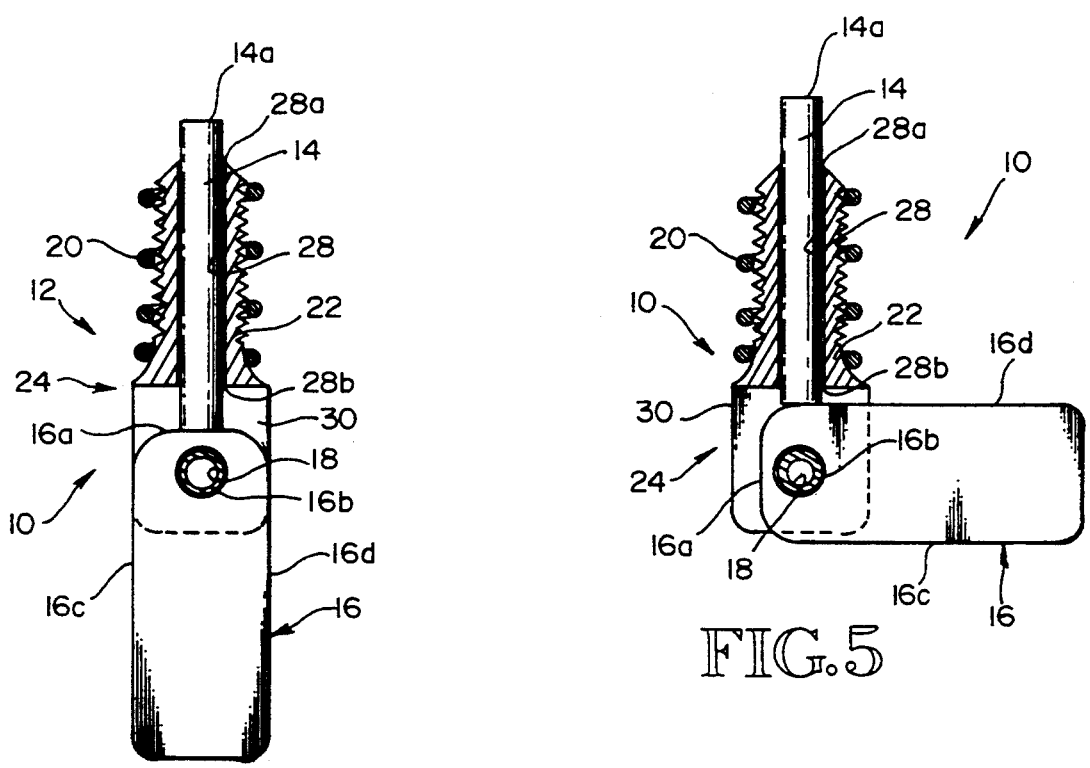
FIG. 4
FIG. 5

MOTORCYCLE THROTTLE CONTROL

FIELD OF THE INVENTION

This invention relates to devices for controlling the setting of a motorcycle hand grip throttle.

DESCRIPTION OF THE RELATED ART

Motorcycle hand grip throttle controls, often called "cruise controls," have been proposed over the years. Typically, such controls mount on the motorcycle handlebar. They are designed to set the hand grip throttle in a desired position. They are designed to hold that position against an internal spring that biases the hand grip throttle toward a neutral position. These devices suffer from a number of deficiencies: some require a complex modification of the standard motorcycle handle bar - throttle grip configuration; and others provide relatively complex and expensive auxiliary equipment to be mounted to control the hand grip throttle.

SUMMARY OF THE INVENTION

The present invention provides an inexpensive, easily-installed hand grip throttle control for motorcycles. The apparatus of the present invention is adapted to be easily adjusted by the motorcycle operator. The apparatus is also designed to be positioned adjacent to one of the handlebar-mounted brake levers so that it can be operated by the thumb or by a finger of the hand resting on handle grip or the brake lever.

BRIEF DESCRIPTION OF THE DRAWINGS

FIG. 3 is a perspective view of the hand grip throttle control of this invention as installed in a motorcycle throttle housing, showing the relationship of the throttle control to the motorcycle hand brake lever;

FIG. 4 is a view in cross-section of the hand grip throttle control of this invention showing its cam lever in the straight-out position; and FIG. 5 is a view in cross-section of the hand grip throttle control of this invention showing its cam lever in the 90° position.

DETAILED DESCRIPTION OF THE INVENTION

Figure 1:
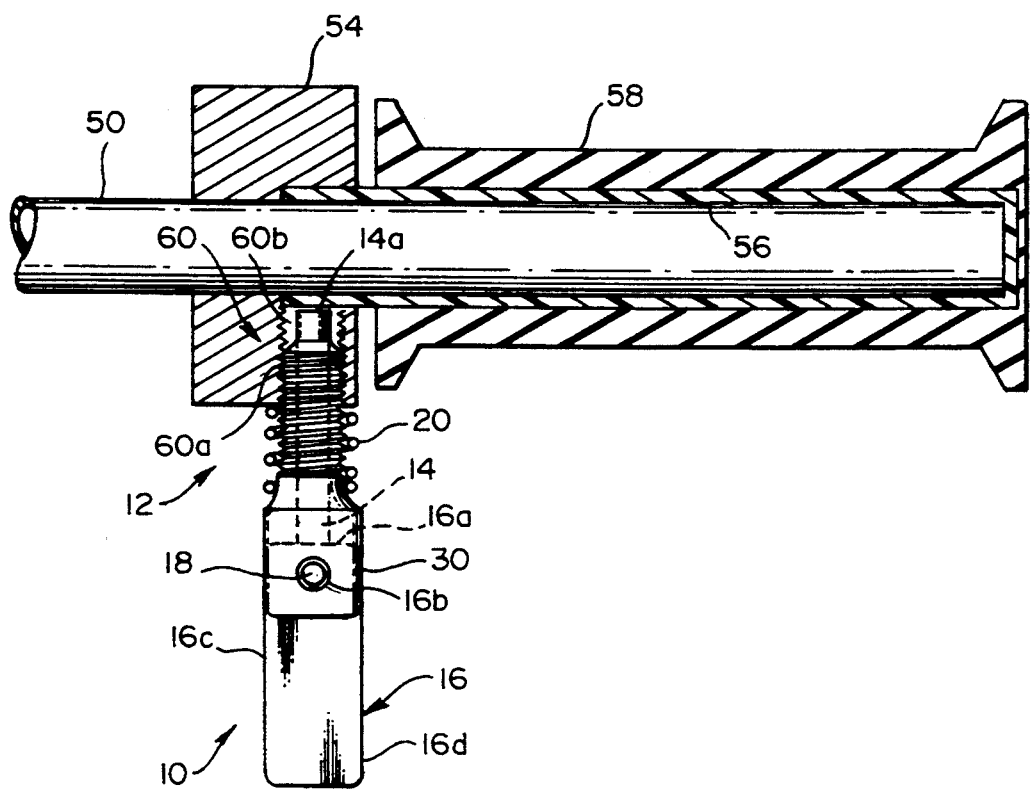
FIG. 1 is a side view in cross-section of a motorcycle throttle grip, throttle housing and throttle drum with the hand grip throttle control of this invention installed in the throttle housing.
Figure 2:
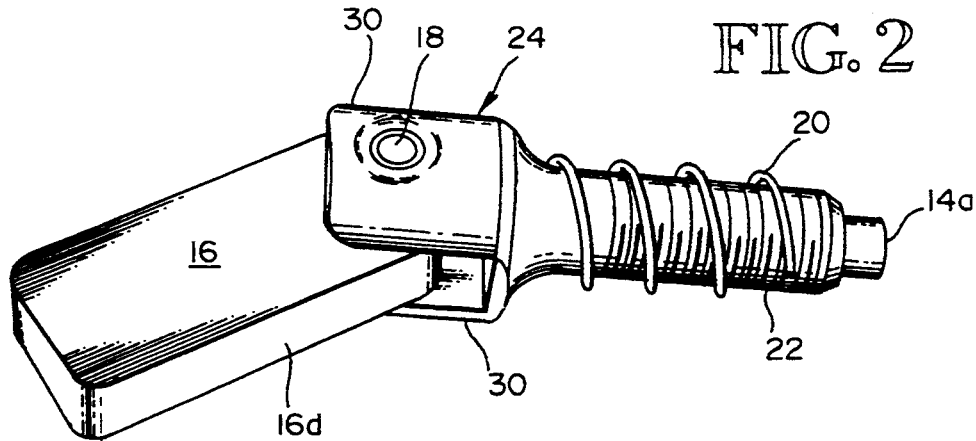
FIG. 2 is a perspective view of the hand grip throttle control of this invention.

Referring to the drawings, the hand grip throttle control 10 of this invention comprises a body 12, a plunger rod 14 slidably mounted within body 12, a cam lever 16 pivotally mounted to body 12 by means of a roll pin 18, and a lock spring 20. Body 12 comprises a cylindrical section 22 and a clevis section 24. The cylindrical section 22 bears external threads 26 and has an axial inner longitudinal passage 28 that opens at both ends of section 22. The clevis section 24 extends axially outward from cylindrical section 22 and provides a pair of mounting tabs 30, the base of the clevis section opening to passage 28 as shown. Plunger rod 14 is cylindrical and slidably fits within passage 28. Plunger rod 14 is longer than passage 28 so that it can protrude beyond the outer end 28a and inner end 28b of passage 28. Cam lever 16 comprises a rectangular bar having an inner end 16a that is contoured to provide a cam surface. Cam lever 16 is pivotally mounted between the clevis tabs 30 by means of the roll pin 18; roll pin 18 being extended through the clevis tabs and cam lever 16. Roll pin 18 is friction fitted in the clevis tabs and passes through an opening 16b that is slightly larger than the roll pin so that cam lever 16 freely rotates about the roll pin. Cam lever 16 protrudes outward beyond the ends of the clevis tabs 30 a sufficient distance to enable a motorcycle operator to engage and pivot the cam lever between a straight-out position and a position 90° to the straight-out position. The cam surface on the inner end 16a of cam lever 16 is configured such that plunger rod 14 can retract within passage 28 when the cam lever is at the straight-out position. The cam surface on the inner end 16a of cam lever 16 is also configured such that plunger rod 14 will be extended outward a predetermined distance beyond the outer end 28a of passage 28 by reason of the cam surface engaging the inner end of plunger rod 14 and forcing plunger rod 14 outward as cam lever 16 is rotated to the 90° position.

A typical motorcycle will have a handlebar 50 on which is mounted a brake control lever 52, a throttle housing 54, a throttle drum 56, and a hand grip 58. The handlebar extends through the throttle housing 54 and rotatably mounts the throttle drum 56. The throttle drum 56 extends axially outward from within the throttle housing 54 and mounts the hand grip 58. When the operator rotates the hand grip 58 about its longitudinal axis, the throttle drum 56 is likewise rotated on handlebar 50 to actuate means within throttle housing 54 to control the motorcycle engine. A brake hand lever 52, as seen in FIG. 3, is also arranged on the handlebar in the vicinity of the throttle housing. These elements of a motorcycle (throttle drum, throttle housing, hand grip, and a brake hand lever) are conventional and well known in the art. Suitable means within this assembly, such as a bias spring, will bias the throttle drum 56 to a neutral or "throttled-down," position. Consequently, in a typical motorcycle, the operator must maintain his hand on hand grip 58 and exert a continuous twisting force thereon to maintain a desired engine speed. This is tedious, at best, and often tiring.

In accordance with the principles of this invention, the throttle housing 54 is drilled and tapped to provide a passage 60; passage 60 having an outer internally threaded section 60a and an inner unthreaded section 60b. The unthreaded section 60b opens to the throttle drum 56, passage 60 being located in throttle housing 54 at a place where the throttle drum 56 will be exposed to the passage as shown. The threaded section 60a of passage 60 is suited for threadedly receiving the threaded section of body 12 of the hand grip throttle control 10. The unthreaded section 60b of passage 60 is large enough to receive the plunger rod 14 and to permit plunger rod 14 to freely reciprocate therein. Body 12 of the hand grip throttle control 10 is screwed into the threaded section 60a of passage 60 a sufficient distance such that the inner end 14a of plunger rod 14 can be cammed into engagement with the outer surface of throttle drum 56. The inner end 28a of body 12 and the inner end of the threaded section 60a of passage 60 may be cooperatively machined such that body 12 may be screwed into passage 60 until it bottoms-out at the base of the threaded section 60a; thereby positively locating body 12 to insure that the inner end 14a of plunger rod 14 can make the desired contact with the outer surface of throttle drum 56.

As thus mounted, when cam lever 16 is in the straight-out position, the plunger rod 14 will not be forced into contact with the outer surface of the throttle drum 56. Consequently, hand grip throttle control 10 will have no effect of the throttle when the cam lever 16 is in the straight-out position. However, when the cam lever 16 is rotated to the 90° position, the inner end 16a of cam lever 16 will contact and force the plunger rod 14 outward so that the outer end 14a of the plunger rod will be forced into contact with the outer surface of the throttle drum 56; it will be cammed into engagement with the throttle drum. As thus mounted, when cam lever 16 is rotated to the 90° position, the plunger rod 14 will exert a sufficient radial force against the outer surface of the throttle drum 56 to hold the throttle drum in a desired position. As a result of camming the plunger rod into engagement with the throttle drum, the operator may release his twisting grip on hand grip 58 and the throttle will remain at the setting existing at the moment the cam lever 16 was rotated to the 90° position. Furthermore, a simple pivoting of cam lever 16 back to the straight-out position will release plunger rod 14 so that the plunger rod no longer exerts a binding force on the throttle drum 56; and the throttle drum will return to its neutral position under the influence of its biasing means.

The inner end 16a of cam lever 16 is flattened at it midpoint, rounded at its outer edges to provide a transition between its flattened midpoint and the flat sides 16c, 16d of the cam lever. As a result of this configuration of its outer edges, when the cam lever 16 is positioned at its straight-out position (FIG. 4) plunger rod 14 will not be urged outward into engagement with throttle drum 56; and when the cam lever 16 is pivoted to its 90° position, the plunger rod 14 will be urged outward to bind against the throttle drum 56. When cam lever 16 reaches its 90° position (FIG. 5), the inner end of plunger rod 14 will bear on one of the cam lever sides, 16c or 16d, thereby stabilizing cam lever 16 in its 90° position. Once in its 90° position, cam lever 16 will remain in that position until manually pivoted to its straight-out position.

The body 12 of hand grip throttle control 10 is enclosed by lock spring 20. When body 12 is screwed into the throttle housing passage 60, lock spring 20 will bear against the outside of throttle housing 54 and against the base of the body clevis section 24 to lock body 12 into position. Thus, lock spring 20 secures body 12 in position against vibratory forces that would tend to cause body 12 to unscrew. A lock nut could be substituted for lock spring 20; such a nut being threaded onto the body threads 26 and screwed down into a clamping engagement with the exterior of throttle housing 54.

The throttle housing passage 60 is preferably located radially of the throttle drum 56. Passage 60 is also preferably located at about 45° down from horizontal, beneath the brake lever 52 as shown. Thus, body 12 will extend downward and outward from the throttle housing 54, beneath the brake lever 52. This location is preferred because the operator can then easily push cam lever 16 toward or away from himself, from the straight-out position to a 90° position. The cam surface on the inner end 16a of cam lever 16 is configured to cam the plunger rod 14 into engagement with the throttle drum 56 when the cam lever 16 is rotated to either side of the body clevis section 24. It is also preferable to align the body 12 such that the body clevis section 24 presents the clevis tabs 30 parallel to the handlebar 50 so that the plane of rotative movement of cam lever 16 is parallel to the longitudinal axis of the throttle drum 56; this making the pivoting movement of cam lever 16 either toward the end of the hand grip 58 or away from the hand grip and toward the handlebar.

It is preferred that the plunger rod 14, when cammed against the outer surface of the throttle drum 56, will only bind the throttle drum to the desired position to the degree necessary to overcome the bias return to neutral- Thus, if for any reason the operator desires to override the hand grip throttle control 10, he may do so by exerting enough twisting force on the hand grip to rotate the throttle drum 56 to a new position; at which point, the operator could again release his grip and the hand grip throttle control 10 would hold the new position. Thus, even though the operator could choose to return the cam lever 16 to the straight-out position to release the hand grip throttle control 10, he could also choose to simply override the hand grip throttle control 10. An operator could choose to override when he is simply adjusting the engine speed to a new constant setting, or he could choose to override in the event that he must quickly increase or decrease engine speed due to sudden or unexpected traffic or hazard conditions.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. Hand grip throttle control apparatus for use with a motorcycle of the type having a motorcycle handlebar, a throttle housing mounted on the handlebar and having a mounting passage for the hand grip throttle control apparatus that communicates with a throttle drum, the throttle drum being rotatably mounted on the handlebar and operably extending into the throttle housing, and a hand grip mounted on the throttle drum, said hand grip throttle control apparatus comprising:
   a) a body, a plunger rod slidably mounted within said body, and a cam lever pivotally mounted to said body;
   b) said body having
      i) a threaded section for for threadably mounting said body in the motorcycle throttle housing, and
      ii) a cam lever mounting section for pivotally mounting said cam lever,
      iii) the body threaded section being provided with an axial longitudinal passage for said plunger rod, the body longitudinal passage having inner and outer ends, the inner end of which being communicable with the motorcycle throttle housing mounting passage;
   c) said cam lever having
      i) an inner end with a cam surface thereon for contacting said plunger rod to shift said plunger rod relative to said body;
   d) said plunger rod being
      i) slidably positioned within the body longitudinal passage, and
      ii) having an outer end juxtaposed with the cam lever cam surface at the outer end of the body longitudinal passage, and
      iii) having an inner end juxtaposed with, and having a length sufficient to extend beyond, the inner end of the body longitudinal passage;
   e) said plunger rod, said cam lever, and said cam surface being so constructed and arranged with respect to one another such that, when said hand grip throttle control apparatus is mounted in the motorcycle throttle housing,
  i) pivoting said cam lever effects the engagement of the cam lever cam surface with the plunger rod outer end to force the plunger rod inward so as to extend the plunger rod inner end a predetermined distance beyond the inner end of the body longitudinal passage,
  ii) whereby the plunger rod inner end is extendable through the motorcycle throttle housing mounting passage into engagement with the motorcycle throttle drum so as to bind the motorcycle throttle drum as a result of the pivoting of said cam lever;
f) said cam lever being pivotally mounted to rotate over a 180° range so as to be rotatable from a straight-out position to a position at 90° to either side of the straight-out position; the cooperative construction among said plunger rod, said cam lever, and said cam surface being such that extension of said plunger rod is effected when said cam lever is rotated from the straight-out position to either 90° position;
g) body securing spring means enclosing the outside of said body threaded section and abutting said cam lever mounting section, said spring means being so constructed and arranged to compressively engage the motorcycle housing when said threaded section is threaded thereinto whereby said body is securable in position against vibratory forces that would tend to cause said body to unscrew.

2. The hand grip throttle control apparatus according to claim 1 wherein
  a) said body is a unitary member with the threaded section being cylindrical, and with the cam lever mounting section being clevis-shaped and provided with a pair of mounting tabs;
  b) said cam lever is rotatably mounted between said pair of mounting tabs for rotation from the straight-out position to a position at 90° to either side of the straight-out position.

3. The hand grip throttle control apparatus according to claim 2 wherein
  a) said cam surface is configured such that said cam lever will be stably secured in the 90° position so as to not be dislodged therefrom in the absence of an external pivoting force being applied to said cam lever to externally return said cam lever to the straight-out position.

4. Hand grip throttle control apparatus for use with a motorcycle of the type having a motorcycle handlebar, a throttle housing mounted on the handlebar and having a mounting passage for the hand grip throttle control apparatus that communicates with a throttle drum, the throttle drum being rotatably mounted on the handlebar and operably extending into the throttle housing, and a handle grip mounted on the throttle drum, said hand grip throttle control apparatus comprising:
  a) a body, a plunger rod slidably mounted within said body, and a cam lever pivotally mounted to said body;
  b) said body having
    i) a threaded section for for threadably mounting said body in the motorcycle throttle housing, and
    ii) a cam lever mounting section for pivotally mounting said cam lever,
    iii) the body threaded section being provided with an axial longitudinal passage for said plunger rod, the body longitudinal passage having inner and outer ends, the inner end of which being communicable with the motorcycle throttle housing mounting passage;
  c) said cam lever having
    i) an inner end with a cam surface thereon for contacting said plunger rod to shift and plunger rod relative to said body;
  d) said plunger rod being
    i) slidably positioned within the body longitudinal passage, and
    ii) having an outer end juxtaposed with the cam lever cam surface at the outer end of the body longitudinal passage, and
    iii) having an inner end juxtaposed with, and having a length sufficient to extend beyond, the inner end of the body longitudinal passage;
  e) said plunger rod, said cam lever, and said cam surface being so constructed and arranged with respect to one another such that, when said hand grip throttle control apparatus is mounted in the motorcycle throttle housing,
    i) pivoting said cam lever effects the engagement of the cam lever surface with the plunger rod outer end to force the plunger rod inward so as to extend the plunger rod inner end a predetermined distance beyond the inner end of the body longitudinal passage,
    ii) whereby the plunger rod inner end is extendable through the motorcycle throttle housing mounting passage into engagement with the motorcycle throttle drum so as to bind the motorcycle throttle drum as a result of the pivoting of said cam lever;
  f) said body being a unitary member with the threaded section being cylindrical, and with the cam lever mounting section being clevis-shaped and provided with a pair of mounting tabs;
  g) said cam lever being pivotally mounted between said pair of mounting tabs to rotate over a range of 180° so as to be rotatable from a straight-out position to a position at 90° to either side of the straight-out position;
  h) the cooperative construction among said plunger rod, said cam lever, and said cam surface being such that extension of said plunger rod is effected when said cam lever is rotated from the straight-out position to either 90° position;
  i) said cam surface being configured such that said cam lever will be stably secured in the 90° position so as to not be dislodged therefrom in the absence of an external pivoting force being applied to said cam lever to externally return said cam lever to the straight-out position;
  j) body securing spring means enclosing the outside of said body threaded section and abutting said cam lever mounting section, said spring means being so constructed and arranged to compressively engage the motorcycle housing when said threaded section is threaded thereinto whereby said body is secureable in position against vibratory forces that would tend to cause said body to unscrew.

5. In combination with a motorcycle of the type having a motorcycle handlebar, a throttle housing mounted on the handlebar and having a mounting passage for the hand grip throttle control apparatus that communicates with a throttle drum, the throttle drum being rotatably mounted on the handlebar and operably extending into the throttle housing, and a hand grip mounted on the throttle drum, hand grip throttle control apparatus mounted on the throttle drum, said hand grip throttle control apparatus comprising:
  a) a body, a plunger rod slidably mounted within said body, and a cam lever pivotally mounted to said body;
  b) said body having
    i) a threaded section threaded into the motorcycle housing mounting passage so as to mount said body in the motorcycle throttle housing, and
    ii) a cam lever mounting section for pivotally mounting said cam lever,
    iii) the body threaded section being provided with an axial longitudinal passage for said plunger rod, the body longitudinal passage having inner and outer ends, the inner end of which communicates with the motorcycle throttle housing mounting passage;
  c) said cam lever having
    i) an inner end with a cam surface thereon for contacting said plunger rod to shift said plunger rod relative to said body;
  d) said plunger rod being
    i) slidably positioned within the body longitudinal passage, and
    ii) having an outer end juxtaposed with the cam lever cam surface at the outer end of the body longitudinal passage, and
    iii) having an inner end juxtaposed with, and having a length sufficient to extend, beyond the inner end of the body longitudinal passage;
  e) said plunger rod, said cam lever, and said cam surface being so constructed and arranged with respect to one another such that,
    i) pivoting said cam lever effects the engagement of the cam lever cam surface with the plunger rod outer end to force the plunger rod inward so as to extend the plunger rod inner end a predetermined distance beyond the inner end of the body longitudinal passage and into the motorcycle throttle housing mounting passage,
    ii) whereby the plunger rod inner end is extendable through the motorcycle throttle housing mounting passage into engagement with the motorcycle throttle drum so as to bind the motorcycle throttle drum as a result of the pivoting of said cam lever;
  f) said cam lever being pivotally mounted to rotate over a 180° range so as to be rotatable from a straight-out position to a position at 90° to either side of the straight-out position; the cooperative construction among said plunger rod, said cam lever, and said cam surface being such that extension of said plunger rod is effected when said cam lever is rotated from the straight-out position to either 90° position;
  g) body securing spring means enclosing the outside of said body threaded section and abutting said cam lever mounting section, said spring means being so constructed and arranged to compressively engage the motorcycle housing when said threaded section is threaded thereinto whereby said body is secureable in position against vibratory forces that would tend to cause said body to unscrew.

6. The hand grip throttle control apparatus according to claim 5 wherein
  a) said body is a unitary member with the threaded section being cylindrical, and with the cam lever mounting section being clevis-shaped and provided with a pair of mounting tabs;
  b) said cam lever is rotatably mounted between said pair of mounting tabs for rotation from the straight-out position to a position at 90° to either side of the straight-out position.

7. The hand grip throttle control apparatus according to claim 6 wherein
  a) said cam surface is configured such that said cam lever will be stablely secured in the 90° position so as to not be dislodged therefrom in the absence of an external pivoting force being applied to said cam lever to externally return said cam lever to the straight-out position.

8. In combination with a motorcycle of the type having a motorcycle handlebar, a throttle housing mounted on the handlebar and having a mounting passage for the hand grip throttle control apparatus that communicates with a throttle drum, the throttle drum being rotatably mounted on the handlebar and operably extending into the throttle housing, and a hand grip mounted on the throttle drum, hand grip throttle control apparatus comprising:
  a) a body, a plunger rod slidably mounted within said body, and a cam lever pivotally mounted to said body;
  b) said body having
    i) a threaded section threaded into the motorcycle housing mounting passage so as to mount said body in the motorcycle throttle housing, and
    ii) a cam lever mounting section for pivotally mounting said cam lever,
    iii) the body threaded section being provided with an axial longitudinal passage for said plunger rod, the body longitudinal passage having inner and outer ends, the inner end of which communicates with the motorcycle throttle housing mounting passage;
  c) said cam lever having
    i) an inner end with a cam surface thereon for contacting an outer end of said plunger rod to shift said plunger rod relative to said body;
  d) said plunger rod being
    i) slidably positioned within the body longitudinal passage, and
    ii) having an outer end juxtaposed with the cam lever cam surface at the outer end of the body longitudinal passage, and
    iii) having an inner end juxtaposed with, and having a length sufficient to extend beyond, the inner end of the body longitudinal passage;
  e) said plunger rod, said cam lever, and said cam surface being so constructed and arranged with respect to one another such that,
    i) pivoting said cam lever effects the engagement of the cam lever cam surface with the plunger rod outer end to force the plunger rod inward so as to extend the plunger rod inner end a predetermined distance beyond the inner end of the body longitudinal passage and into the motorcycle throttle housing mounting passage,
    ii) whereby the plunger rod inner end is extendable through the motorcycle throttle housing mounting passage into engagement with the motorcycle throttle drum so as to bind the motorcycle throttle drum as a result of the pivoting of said cam lever;

f) said body being a unitary member with the threaded section being cylindrical, and with the cam lever mounting section being clevis-shaped and provided with a pair of mounting tabs;

g) said cam lever being pivotally mounted between said pair of mounting tabs to rotate over a 180° range so as to be rotatable from a straight-out position to a position at 90° to either side the straight-out position;

h) the cooperative construction among said plunger rod, said cam lever, and said cam surface being such that extension of said plunger rod is effected when said cam lever is rotated from the straight-out position to either 90° position;

i) said cam surface being configured such that said cam lever will be stably secured in the 90° position so as to not be dislodged therefrom in the absence of an external pivoting force being applied to said cam lever to externally return said cam lever to the straight-out position;

j) body securing spring means enclosing the outside of said body threaded section and abutting said cam lever mounting section, said spring means being so constructed and arranged to compressively engage the motorcycle housing when said threaded section is threaded thereinto whereby said body is secureable in position against vibratory forces that would tend to cause said body to unscrew.

* * * * *